US011770876B2

(12) United States Patent
Halberg et al.

(10) Patent No.: US 11,770,876 B2
(45) Date of Patent: Sep. 26, 2023

(54) HEATER CONTROL SYSTEM

(71) Applicant: PHILLIPS & TEMRO INDUSTRIES INC., Eden Prairie, MN (US)

(72) Inventors: Roger J. Halberg, Savage, MN (US); Steven W. Tonkin, Eden Prairie, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 388 days.

(21) Appl. No.: 16/605,307

(22) PCT Filed: May 8, 2018

(86) PCT No.: PCT/US2018/031623
§ 371 (c)(1),
(2) Date: Oct. 15, 2019

(87) PCT Pub. No.: WO2018/208794
PCT Pub. Date: Nov. 15, 2018

(65) Prior Publication Data
US 2020/0045774 A1 Feb. 6, 2020

Related U.S. Application Data

(60) Provisional application No. 62/503,629, filed on May 9, 2017.

(51) Int. Cl.
*H05B 1/02* (2006.01)
*G05D 23/19* (2006.01)
(52) U.S. Cl.
CPC ....... *H05B 1/0244* (2013.01); *G05D 23/1931* (2013.01); *G05D 23/1951* (2013.01); *H05B 1/0236* (2013.01)

(58) Field of Classification Search
CPC ........... G05D 23/1906; G05D 23/1909; G05D 23/1912; G05D 23/1913; G05D 23/1931;
(Continued)

(56) References Cited

U.S. PATENT DOCUMENTS 4,138,607 A * 2/1979 Engelmann ............... H02J 3/14
219/485
5,870,423 A * 2/1999 Gustavsson .............. H05B 3/62
373/104
(Continued)

FOREIGN PATENT DOCUMENTS

| CN | 2410665 Y | 12/2000 |
|---|---|---|
| CN | 1370261 A | 9/2002 |

(Continued)

OTHER PUBLICATIONS

CA Extended European Search Report issued in related EPSN 18798254.1 dated Dec. 4, 2019.
(Continued)

*Primary Examiner* — John J Norton
(74) *Attorney, Agent, or Firm* — Harness, Dickey & Pierce, P.L.C.

(57) ABSTRACT

A heater control system is disclosed. In an embodiment, the heater control system includes a fluid heater that includes a heating element. The heating element controlled by a switch. The heater control system also includes a controller that can operate the switch. The controller is configured to determine whether a temperature associated with the fluid heater is below a predetermined temperature threshold. The controller causes the switch to transition to an operational state when the temperature is below the predetermined temperature threshold allowing current to flow through the at least one heating element.

19 Claims, 7 Drawing Sheets

(58) Field of Classification Search
CPC ... H05B 1/0244; F24H 9/2014; F24H 9/2021; F24H 9/2028; F24H 1/201; F24H 1/202
See application file for complete search history.

(56) References Cited

U.S. PATENT DOCUMENTS

| | | | |
|---|---|---|---|
| 5,936,156 | A | 8/1999 | Roberts et al. |
| 6,246,831 | B1 | 6/2001 | Seitz et al. |
| 6,943,325 | B2 | 9/2005 | Pittman et al. |
| 2007/0272678 | A1* | 11/2007 | Meyuchas ............... G06F 1/206 219/494 |
| 2009/0126652 | A1 | 5/2009 | Murphy et al. |
| 2010/0089339 | A1 | 4/2010 | Krause et al. |
| 2013/0020864 | A1* | 1/2013 | Smajlovic .......... B60H 1/00657 307/9.1 |
| 2013/0271074 | A1* | 10/2013 | Federico ............. B60L 15/2045 320/109 |
| 2013/0279891 | A1 | 10/2013 | Laing |
| 2015/0210140 | A1* | 7/2015 | Matsuoka .......... B60H 1/00849 165/203 |
| 2017/0217328 | A1* | 8/2017 | Patel ........................ B60K 1/04 |
| 2019/0124722 | A1* | 4/2019 | Young ..................... H05B 3/42 |

FOREIGN PATENT DOCUMENTS

| | | |
|---|---|---|
| CN | 1538259 A | 10/2004 |
| CN | 1631305 A | 6/2005 |
| CN | 2713524 Y | 7/2005 |
| CN | 101440996 A | 5/2009 |
| CN | 103109460 A | 5/2013 |
| CN | 103703327 A | 4/2014 |
| CN | 103889288 A | 6/2014 |
| CN | 106403265 A | 2/2017 |
| GB | 2358971 A | 8/2001 |
| JP | 2004191710 A | 7/2004 |
| KR | 100804354 B1 | 2/2008 |
| RU | 76084 U1 * | 9/2008 |
| WO | WO-2010069356 A1 | 6/2010 |
| WO | WO-2013126945 A1 | 9/2013 |

OTHER PUBLICATIONS

International Search Report and Written Opinion issued in PCT/US2018/031623, dated Aug. 21, 2018; ISA/KR.
Office Action from European Patent Office dated Sep. 11, 2020 for Application No. 18 798 254.1 (6 pages).
Office Action regarding Chinese Patent Application No. 201880030144.8, dated Jun. 2, 2021.

* cited by examiner

HEATER CONTROL SYSTEM

FIELD

The present disclosure relates to a control system for controlling a fluid heater and more particularly to a control system that controls the fluid heater and heating elements of the fluid heater.

SUMMARY

A heater control system is disclosed. In an embodiment, the heater control system includes a fluid heater including at least one heating element that is operatively controlled by a switch. The heater control system also includes a controller that can operate the switch. The controller is configured to determine whether a temperature associated with the fluid heater is below a predetermined temperature threshold and to determine whether a zero-crossing event is occurring. The controller causes the switch to transition to an operational state when the temperature is below the predetermined temperature threshold and a zero-crossing event is occurring allowing current to flow through at least one heating element of the fluid heater.

In some embodiments of the present disclosure, the heater control system further includes a pump driving circuit that is configured to at least one of pulse-width modulate or phase modulate an alternating current (AC) signal, and the modulated AC signal is provided to a pump that is configured to regulate a flow rate of fluid within the fluid heater.

In some embodiments, the heater control system includes an electromagnetic radiation source, and the controller is configured to cause the electromagnetic radiation source to emit electromagnetic radiation to cause the switch to transition to the operational state when the temperature is below the predetermined temperature threshold and the zero-crossing event is occurred allowing current to flow through the heating element.

In some embodiments, the switch includes an optical bidirectional triode thyristor that is configured to transition to the operational state when the optical bidirectional triode thyristor detects the electromagnetic radiation.

In some embodiments, the heater control system further includes a pulse-width modulation device that is configured to generate a pulse-width modulated signal based upon a difference between the temperature and the predetermined temperature threshold.

In some embodiments, the fluid heater includes at least one of a single phase resistive fluid heater, a two phase resistive fluid heater, or a three phase resistive fluid heater.

In some embodiments, the heater control system further includes a number of switches and the fluid heater includes a phase characteristic, and the number of switches corresponds to the phase characteristic.

A heater control is disclosed. In an embodiment, the heater control system includes a controller that is connected to a switch that is connected to a fluid heater. The controller is configured to determine whether a temperature associated with the fluid heater is below a predetermined temperature threshold, determine whether a zero-crossing event is occurring, and cause the switch to transition to an operational state when the temperature is below the predetermined temperature threshold and a zero-crossing event is occurring allowing current to flow through at least one heating element of the fluid heater.

In some embodiments, the heater control further includes a pump driving circuit that is configured to at least one of pulse-width modulate or phase-modulate an alternating current (AC) signal, and the modulated AC signal is provided to a pump that is configured to regulate a flow rate of fluid within the fluid heater.

In some embodiments, the heater control further includes a pulse-width modulation device that is configured to generate a pulse-width modulated signal based upon a difference between the temperature and the predetermined temperature threshold.

In some embodiments, the heater control further includes an electromagnetic radiation source, and the controller is configured to cause the electromagnetic radiation source to emit electromagnetic radiation to cause the switch to transition to the operational state when the temperature is below the predetermined temperature threshold and the zero-crossing event is occurred allowing current to flow through the at least one heating element.

In some embodiments, the switch includes an optical bidirectional triode thyristor that is configured to transition to the operational state when the optical bidirectional triode thyristor detects the electromagnetic radiation.

In some embodiments, the electromagnetic radiation source comprises a light-emitting diode.

In some embodiments, the fluid heater includes at least one of a single phase resistive fluid heater, a two phase resistive fluid heater, or a three phase resistive fluid heater.

In some embodiments, the heater control includes a number of switches and the fluid heater includes a phase characteristic, and the number of switches corresponds to the phase characteristic.

A heater control system is disclosed. In an embodiment, the heater control system includes a fluid heater including at least one heating element that is operatively controlled by a switch, a pulse-width modulation device, and a controller that is connected to the switch. The controller is configured to determine whether a temperature associated with the fluid heater is below a predetermined temperature threshold, determine whether a zero-crossing event is occurring, and cause the pulse-width modulation device to generate a pulse-width modulated signal to control the switch when the temperature is below the predetermined temperature threshold and the zero-crossing event is occurring allowing current to flow through the at least one heating element.

In some embodiments, the heater control system further includes a pump driving circuit that is configured at least one of pulse-width modulate or phase modulate an alternating current (AC) signal, wherein the modulated AC signal is provided to a pump that is configured to regulate a flow rate of fluid within the fluid heater.

In some embodiments, the switch comprises an optical bidirectional triode thyristor that is configured to transition to an operational state when the optical bidirectional triode thyristor detects electromagnetic radiation generated by an electromagnetic radiation source controlled by the controller.

In some embodiments, the resistive fluid heater includes at least one of a single phase resistive fluid heater, a two phase resistive fluid heater, or a three phase resistive fluid heater.

In some embodiments, the heater control system further includes a number of switches and the fluid heater includes a phase characteristic, and the number of switches corresponds to the phase characteristic.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A heater control system for a fluid heater is disclosed. The heater control system includes a controller. The controller can selectively operate one or more switches to cause a heating element to generate heat. The controller also can include a communication module that is connected with memory (i.e., nonvolatile memory) that can be used to configure the fluid heater(s) to operate at several configurable temperature setpoints during manufacturing which allows one assembly to be configured for multiple models. The setpoints may be modified in the field by the customer if desired to change the setpoint by way of a client device in communication with the controller.

The controller maintains date/time characteristics from the AC line frequency, which can be configured to allow automatic startup at certain times, at certain fluid, or ambient temperature conditions, or a combination of time and temperature. An example would be in a vehicle where the operator wants the vehicle warm in the morning when the operator does not want to expend energy to heat it all night. The operator could configure the fluid heater to operate when it is less than 3 hours from departure time, the ambient temperature is below 10 degrees, and/or the fluid is below the ideal starting temperature, which may be a function of the ambient temperature itself. In this case, the controller could notify the operator one hour before the desired departure time if the heater is not at the expected temperature or an error condition was detected. The controller may also be augmented with circuitry to detect ground faults for additional safety.

Figure 1:
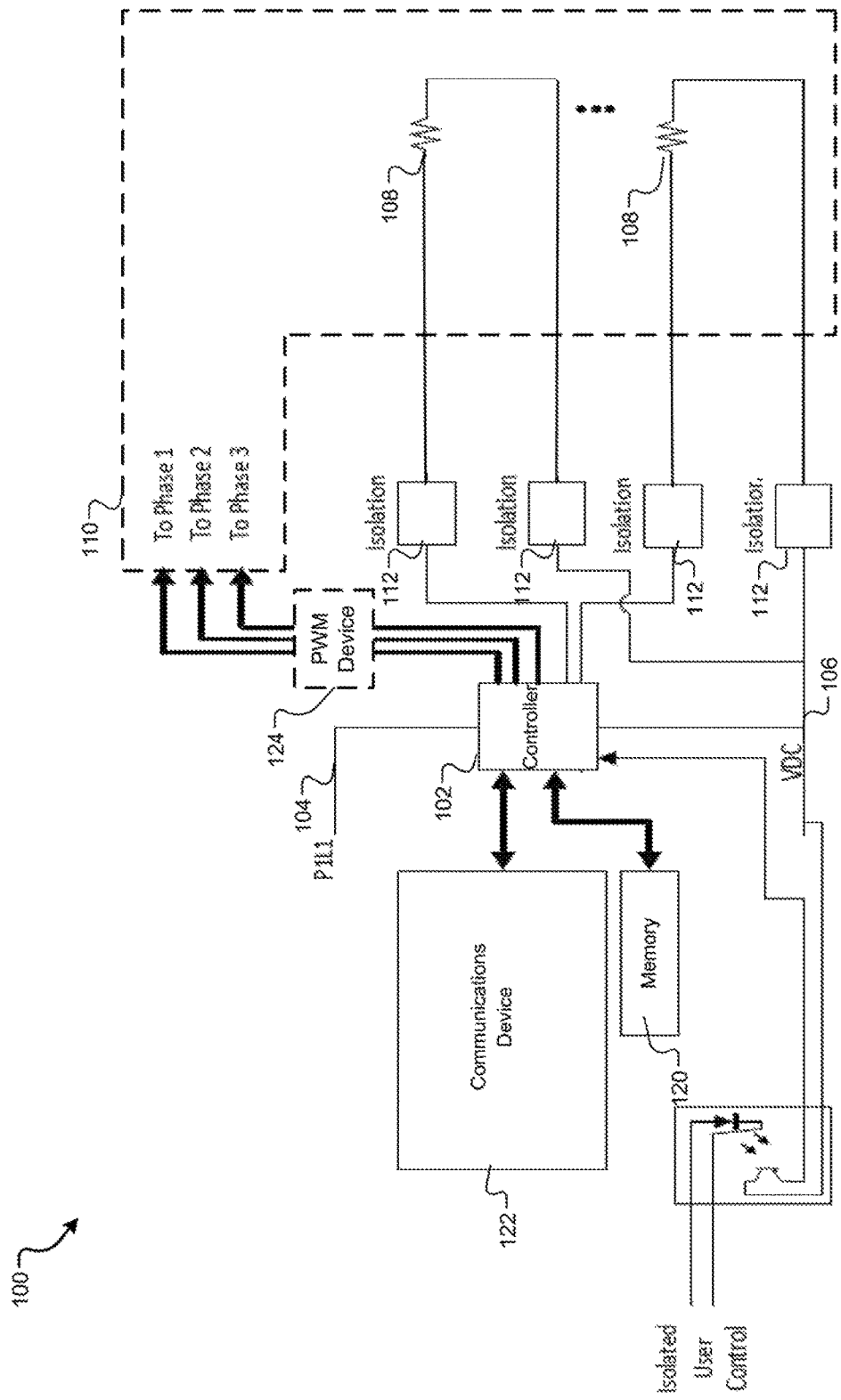
FIG. 1 illustrates an example block diagram of a heater control system in accordance with an example implementation of the present disclosure.

FIG. 1 illustrates an example heater control system 100 in accordance with an example implementation of the present disclosure. As shown, the heater control system 100 includes a controller 102. The controller 102 receives power via a first terminal 104 and a second terminal 106. The controller 102 can connect directly to one or more powerlines via the terminals 104, 106 to receive power from the powerlines.

The controller 102 is communicatively connected with one or more temperature sensors 108. In an example implementation, the temperature sensors 108 are thermistors. The temperature sensors 108 are deployed within a fluid heater 110. In various embodiments, the fluid heater 110 may be a single phase resistive fluid heater, a two phase resistive fluid heater, or a three phase resistive fluid heater. The temperature sensors 108 measure a temperature within the corresponding areas, or zones, of the fluid heater 110. However, it is understood that the fluid heater may comprise any suitable fluid heater. In some embodiments, the system 100 includes one or more isolation components 112 between the controller 102 and the respective temperature sensors 108. The isolation components 112 may be resistive elements, such as resistors, to limit voltage to protect the controller 102 within the heater control system 100.

The controller 102 controls one or more operational aspects of the fluid heater 110. For example, upon receiving suitable power at the terminals 104, 106, the controller 102 transitions from a non-operational state to an operational state. The controller 102 receives one or more temperature signals from the temperature sensors 108 indicative of the temperature within the respective area of the fluid heater 110. Depending upon the temperature signals, the controller 102 can generate a signal to selectively cause a heating element of the fluid heater 110 to generate heat. Additionally, depending upon the temperature signals, the controller 102 can selectively prevent a heating element of the fluid heater 110 from generating heat. The temperature signal may be indicative of a fault within the heater control system 100. For example, by monitoring the temperatures of several zones, the controller 102 can determine how fast the fluid is moving through the fluid heater 110. In an example embodiment, the controller 102 can employ a look-up table that includes one or more temperatures that correspond to an estimated flow rate indicative of how fast the fluid is moving through the fluid heater 110.

Thus, the controller 102 detects faults within the fluid heater 110. For example, a fault detection may be indicative of blockages or loss of fluid in the fluid heater 110. Additionally, if the temperature of one or more zones (i.e., areas) rises faster than expected, the controller 102 detects the fault and prevents thermal runaway of the heating elements by selectively preventing the heating element from emitting heat. For instance, the heater elements heat up faster in air than in fluid. Thus, the controller 102 can utilize the look-up table to compare a change in measured temperature over a predetermined time period with an expected change in temperature over the predetermined time period. If the change exceeds the expected change, the controller 102 can generate an error signal that is transmitted to a client device of an operator.

Figure 2:
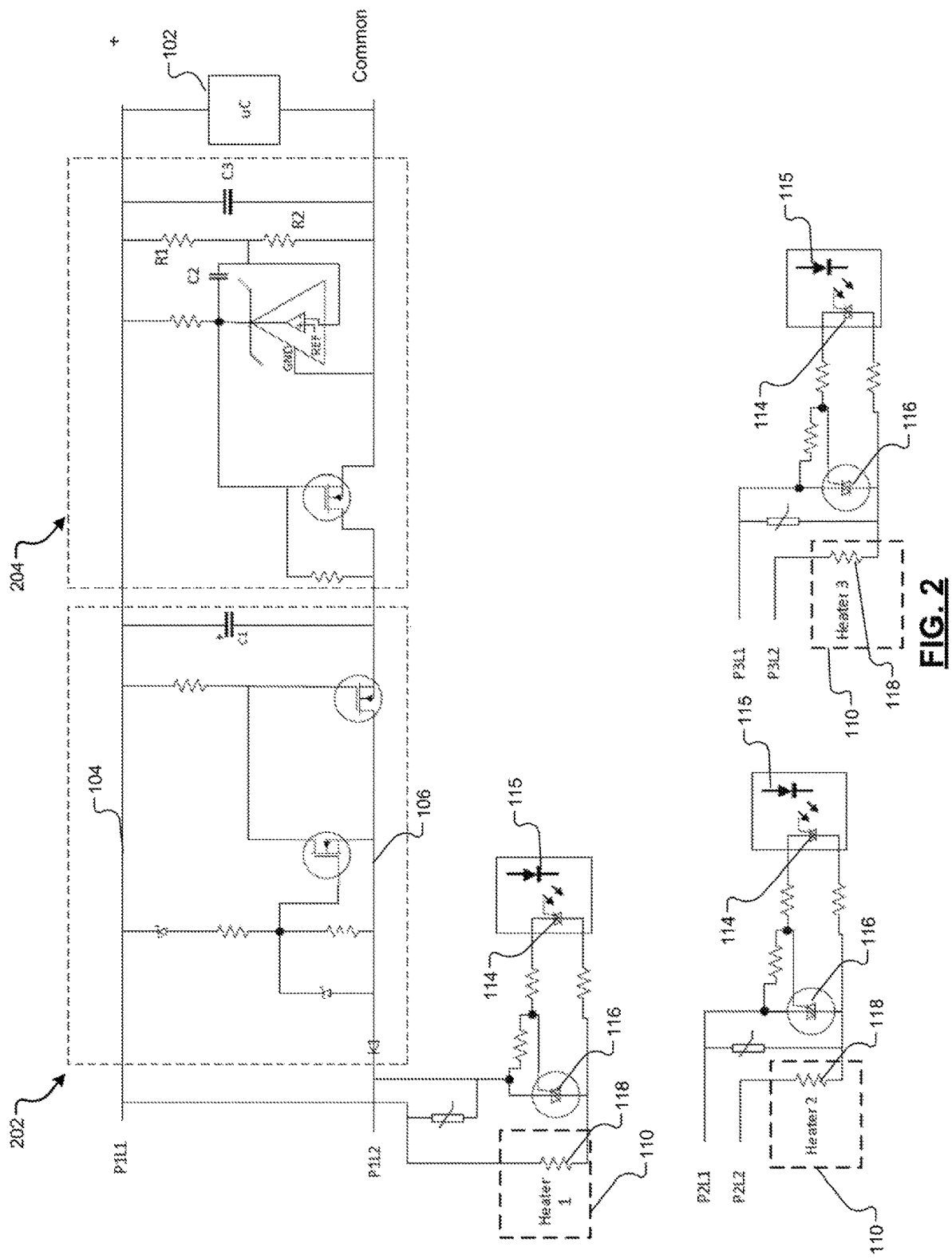
FIG. 2 illustrates an example circuit schematic of a heater control system in accordance with an example implementation of the present disclosure.

Generally referring to FIGS. 1 and 2, the controller 102 is operatively connected to one or more switches 114 for operating the respective heating elements. In an example implementation, the switches 114 comprise optical bidirectional triode thyristors 116 or bidirectional triode thyristors 116. However, it is understood that the switches 114 may comprise any switching device, such as transistors, and the like. The number of switches 114, 116 corresponds to the phase of the fluid heater 110. In an example implementation, the controller 102 is operatively connected to one or more electromagnetic radiation sources 115 that emit electromagnetic radiation that transition a corresponding optical bidirectional triode thyristor to an operational state allowing current to flow through a bidirectional triode thyristor 116. Since current is flowing through the bidirectional triode thyristor 116, current flows through the respective heating element 118 to generate heat. In an example, the electromagnetic radiation sources 115 comprise light emitting diodes.

The controller 102 also communicates with memory 120 that is configured to retain data pertaining to the heater control system 100. In one or more embodiments, the memory 120 includes nonvolatile memory. The memory 120, for example, can include configurable setpoints, or threshold values. For instance, an operator or manufacturer can set an event, such as a programmable crossing events (i.e., programmable zero-crossing event) and/or programmable temperature. The memory 120 can also retain data for data logging purposes, diagnostic data, fault data, and the like. The heater control system 100 also includes a communication device 122 that communicates with the controller 102.

The heater control system 100 may also include a pulse-width modulation device 124. The pulse-width modulation device 124 can receive control signals from the controller 102. Based upon the control signals, the pulse-width modulation (PWM) device 124 provides pulse-width modulated signals to the switches 114, 116 to control heating of the corresponding heating element 118. For example, the pulse-width modulated signals can control the current provided to a preselected switch 114, 116, which can modulate current provided to the corresponding heating element 118. For example, the pulse-width modulation device 124 can provide a pulse-width modulated signal that averages the current provided to the heating element 118 based upon the temperature. In some examples, the controller 102 provides control signals based upon a comparison of the measured temperature and the setpoint. Thus, the pulse-width modulated signal may be relatively greater when the difference between the measured temperature and the setpoint is greater than a predetermined temperature threshold and may be relatively smaller when the difference is less than the predetermined temperature threshold, The pulse-width modulation device 124 may be controlled using predetermined temperature characteristics, such as the setpoints and predetermined temperature thresholds, stored in the memory 120.

Figure 3:
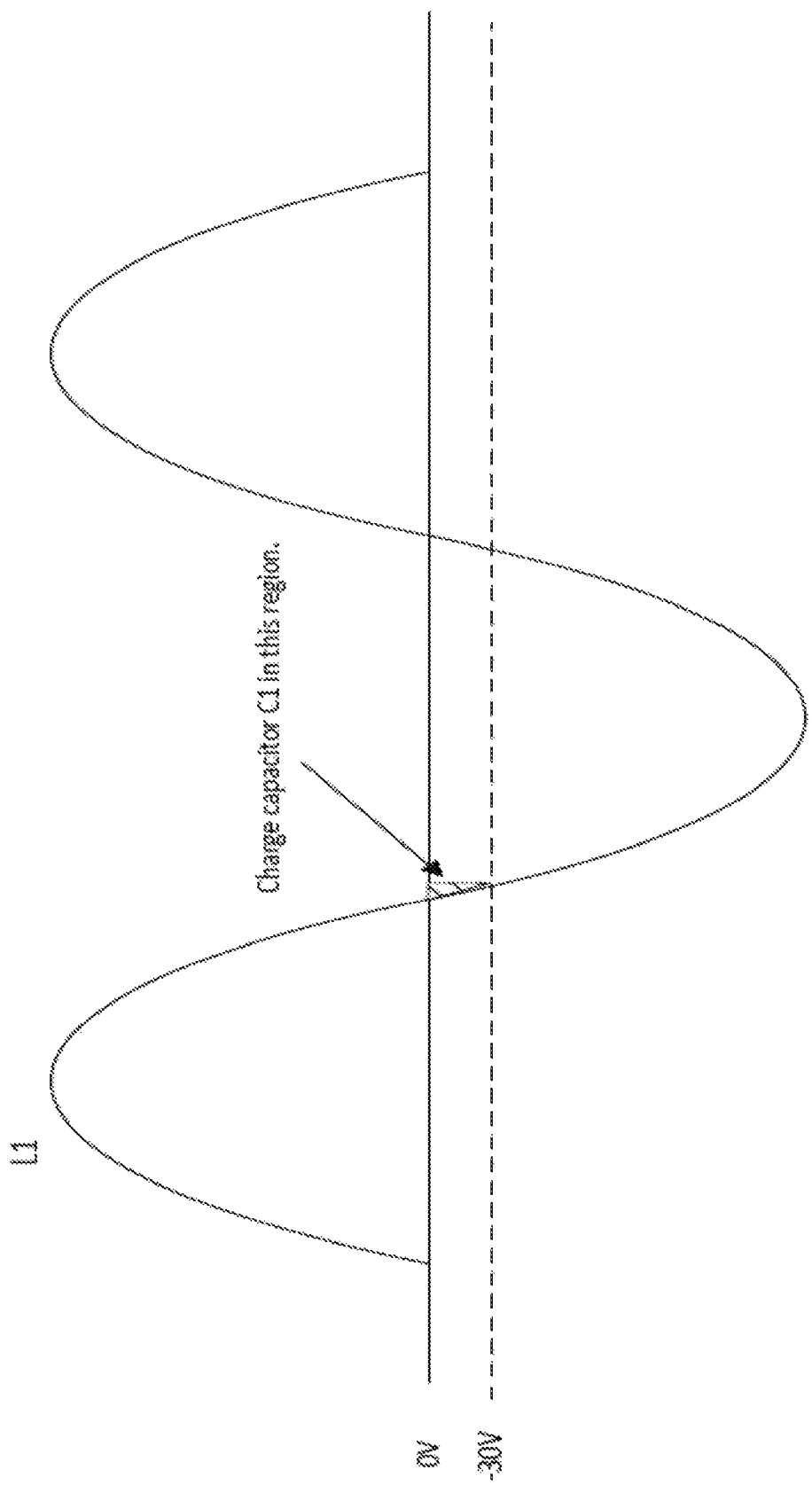
FIG. 3 illustrates an example graph illustrating an alternating current (AC) signal that charges a capacitor that powers a controller of the heater control system in accordance with an example implementation of the present disclosure.

FIG. 2 illustrates an example power supply 202 and regulator 204 that connects to one or more powerlines (e.g., P1L1, P1L2, P2L1 P2L2, P3L1, P3L2). The powerlines may comprise terminals 104, 106 in one or more implementations of the present disclosure. The power supply 202 receives an alternating current signal. The capacitor C1 charges based upon the signal characteristics of the alternating current signal, as shown in FIG. 3. The charged capacitor provides charge to the regulator 204, which regulates the voltage characteristics to provide a suitable power supply to the controller 102.

Figure 4:
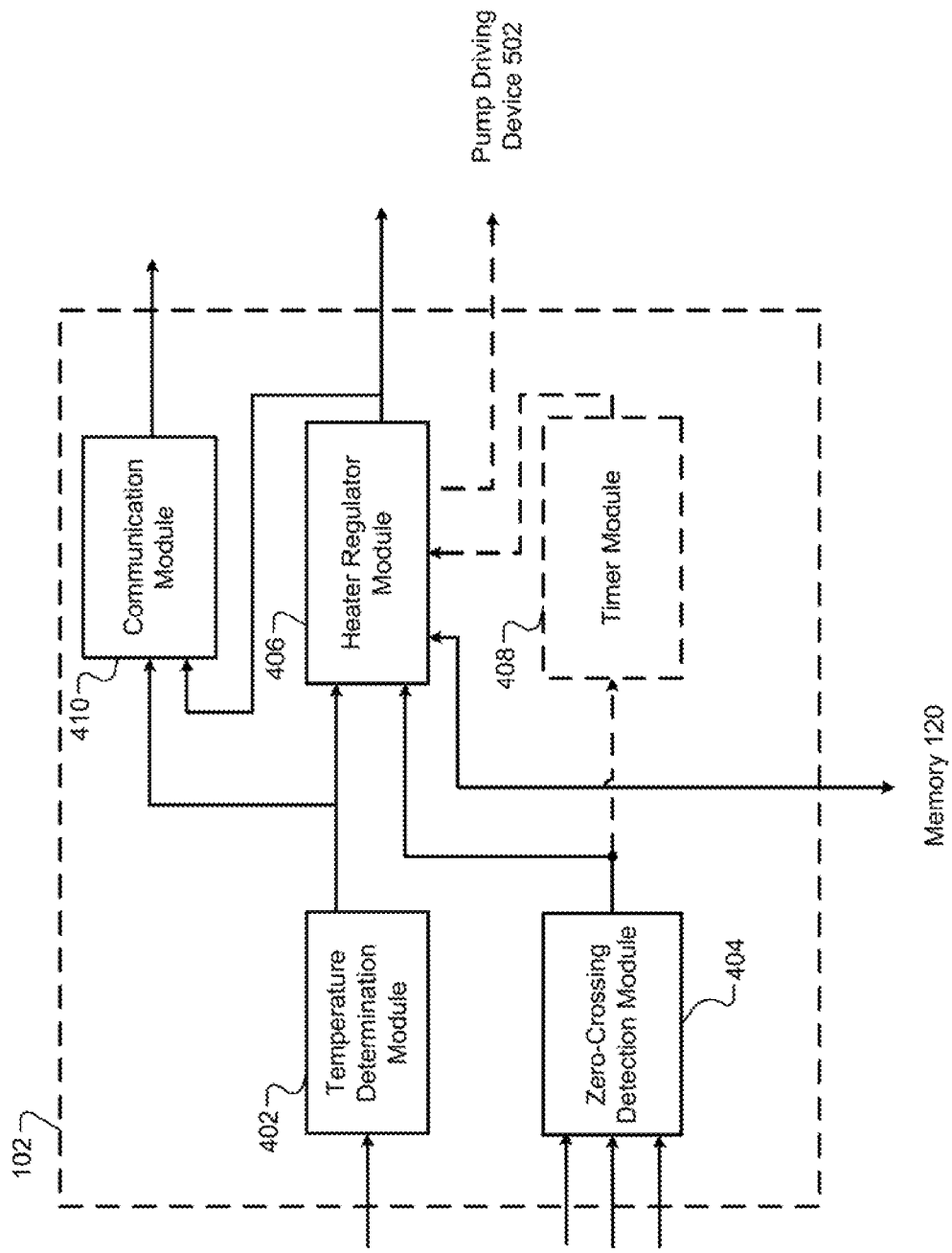
FIG. 4 is a block diagram illustrating a controller of the heater control system in accordance with an example implementation of the present disclosure.

FIG. 4 illustrates an example controller 102 to selectively control operation states of the fluid heater 110. As shown, the controller 102 includes a temperature determination module 402, a zero crossing detection module 404, and a heater regulator module 406.

The temperature determination module 402 receives temperature signals from the one or more temperature sensors 108. The temperature determination module 402 compares the measured temperature with a predetermined temperature threshold. If the temperature is above the predetermined temperature threshold, the temperature determination module 402 provides a temperature signal to the heater regulator module 406.

The zero-crossing detection module 404 receives alternating current signals from respective powerlines (e.g., P1L1, P1L2, P2L1, P2L2, P3L1, P3L2). For instance, the zero-crossing detection module 404 receives signals associated with each phase of the heater control system 100. The zero-crossing module 404 monitors the alternating current signals for zero-crossing states and generates a zero-crossing signal indicative that no voltage is present within the respective alternating current signals.

The heater regulator module 406 receives the temperature signal and the zero-crossing signal from the modules 402, 404. The heater regulator module 406 generates one or more signals to control operation of the fluid heater 110 based upon the temperature signal and the zero-crossing signal. For example, when the heater regulator module 406 receives the temperature signal to generate heat and that a zero-crossing event is occurring, the heater regulator module 406 generates a signal to cause the electromagnetic radiation sources 115 to generate electromagnetic radiation. For example, the heater regulator module 406 initiates operation of a zero-crossing optical bidirectional triode thyristor to generate heat with the respective heating element. The heater regulator module 406 also prevents operation of the respective heating element when the temperature signal indicates that a measured temperature exceeds an operational temperature threshold. In another example, the heater regulator module 406 is in direct communication with the respective switches 114, 116. Thus, the heater regulator module 406 can transmit a control signal to cause the switch 114, 116 to transition to an operational state.

The heater regulator module 406 may also provide control signals to the pulse-width modulation device 124, which control the operational state of the switches 114, 116. For example, the heater regulator module 406 may access the memory 120 to receive a corresponding set-point associated with a fluid heater 110. The heater regulator module 406 may then determine a duration of the pulse-width modulated signal based upon a comparison of the temperature signal and the set-point. For instance, the heater regulator module 406 may access a look-up table including a predetermined duration of the pulse-width modulated signal using the corresponding set-point and the received temperature signal.

The controller 102 also includes a timer module 408 in some embodiments. The timer module 408 initiates a timer upon detection of an AC zero crossing event. This event may be detected by the zero-crossing detection module 404. The zero crossing event detection module 404 can also provide pulses corresponding to the signals at the powerlines for the controller 102 for synchronization and/or clock timing.

The controller 102 also includes a communication module 410 that generates communication signals to transmit to an operator. For example, the communication module 410 may be initiated upon detection of a potential fault from the temperature determination module 402. The communication module 410 is in communication with the communication device 122, which transmits the data to the operator.

Figure 5:
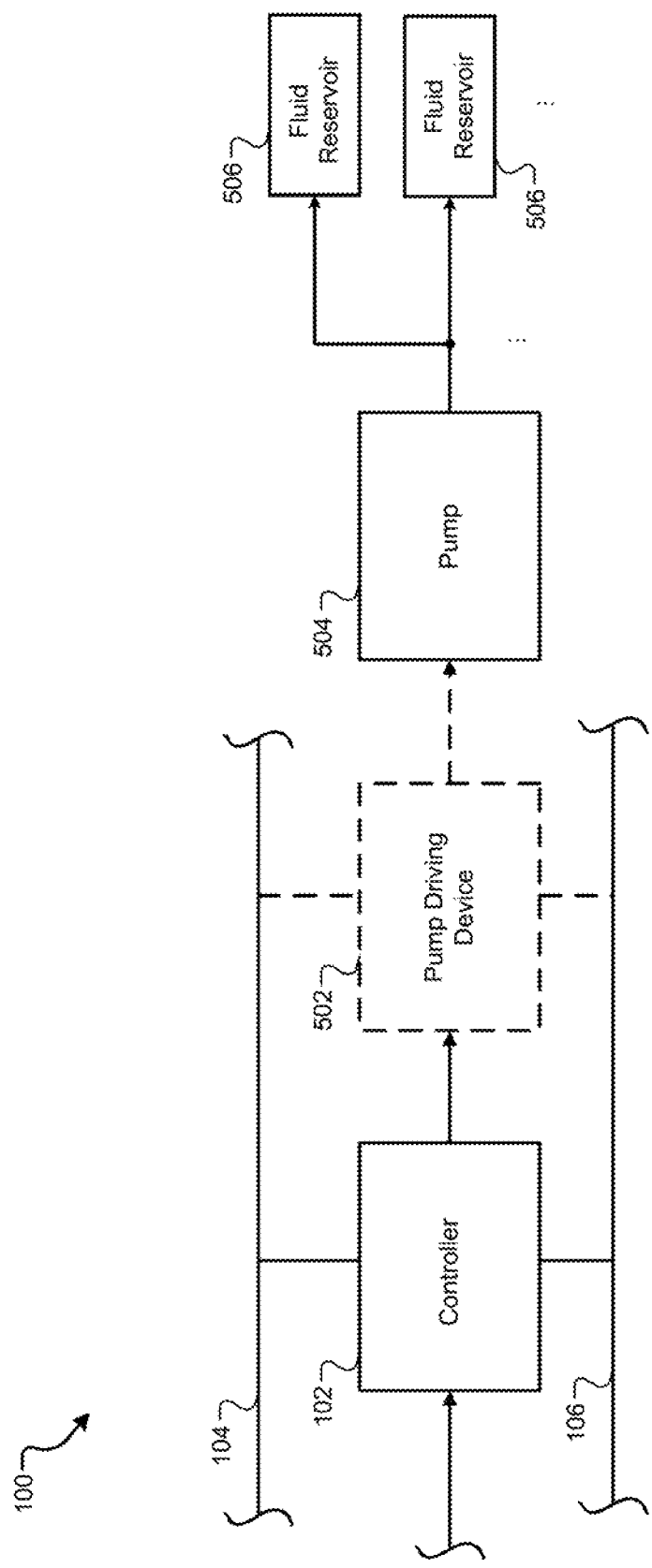
FIG. 5 is a block diagram illustrating an example pump driving device of the heater control system in accordance with an example implementation of the present disclosure.

FIG. 5 illustrates another implementation of the heater control system 100. The heater control system 100 may include a pump driving device 502 that is connected to the controller 102. The heater control system 100 may also include a pump 504 that regulates the flow of liquid. For example, the pump 504 is connected to one or more fluid reservoirs 506, and the fluid heaters 110 heat the liquid as described above. The pump driving device 502 is connected to the terminals 104, 106 and regulates voltage to the pump 504.

The pump driving device 502 receives an input voltage requirement from the controller 102. For example, the heater regulator module 406 can access the memory 120 to obtain the input voltage requirement for the pump 504. The input voltage requirement may be preprogrammed within the memory 120 by an operator, or the like. The heater regulator module 406 controls the operational states of the pump 504 via the pump driving device 502 based upon the voltage signal input at the terminals 104, 106 and/or a timing signal provided by the timer module 408. For instance, the heater regulator module 406 can provide control signals to the pump driving device 502 to control operation of the pump 504 based upon the timing signal. It is understood that the pump 504 and the fluid heaters 110 may operate independent of one another. For example, the fluid heater 110 may be generating heat when the pump 504 is not operational, and the pump 504 may operate when the fluid heater 110 is not generating heat.

Figure 6:
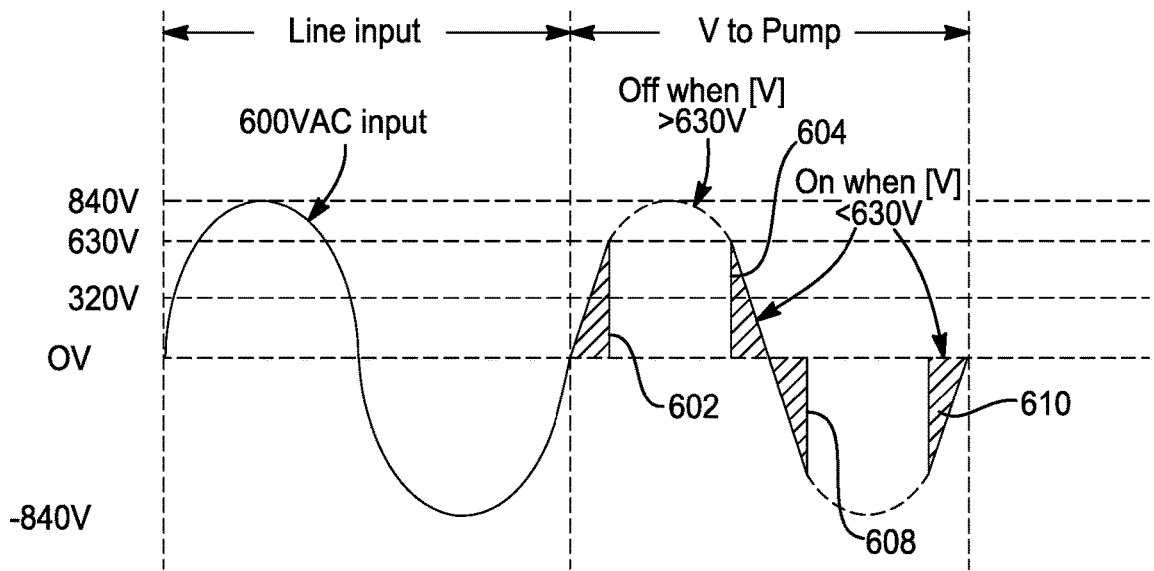
FIG. 6 is a graph illustrating example operational states of a pump controlled by the pump driving device that phase-modulates an AC signal in accordance with an example implementation of the present disclosure.

FIG. 6 is an example graph illustrating an alternating current voltage input signal provided via terminals 104, 106 and the corresponding operational states of the pump 504 as controlled by the controller 102 and/or the pump driving device 502. In an example implementation, the controller 102 and the pump driving device 502 operates the pump 504 based upon a voltage line input at the terminals 104, 106. For instance, the pump 504 is operational when the voltage at the terminals 104, 106 is below an absolute value of the predetermined voltage threshold as illustrated in shaded portions 602, 604, 608, 610 and does not operate when the voltage is above the absolute value of the predetermined voltage threshold. In this implementation, the controller 102 controls the pump driving device 504 to phase-modulate a relatively higher AC voltage to provide a desired average power to the pump 504. In an example implementation, the control of the controller 102 controls the pump using the timing signal set with respect to the zero crossings to indicate when the line voltage reaches the predetermined voltage threshold.

Figure 7:
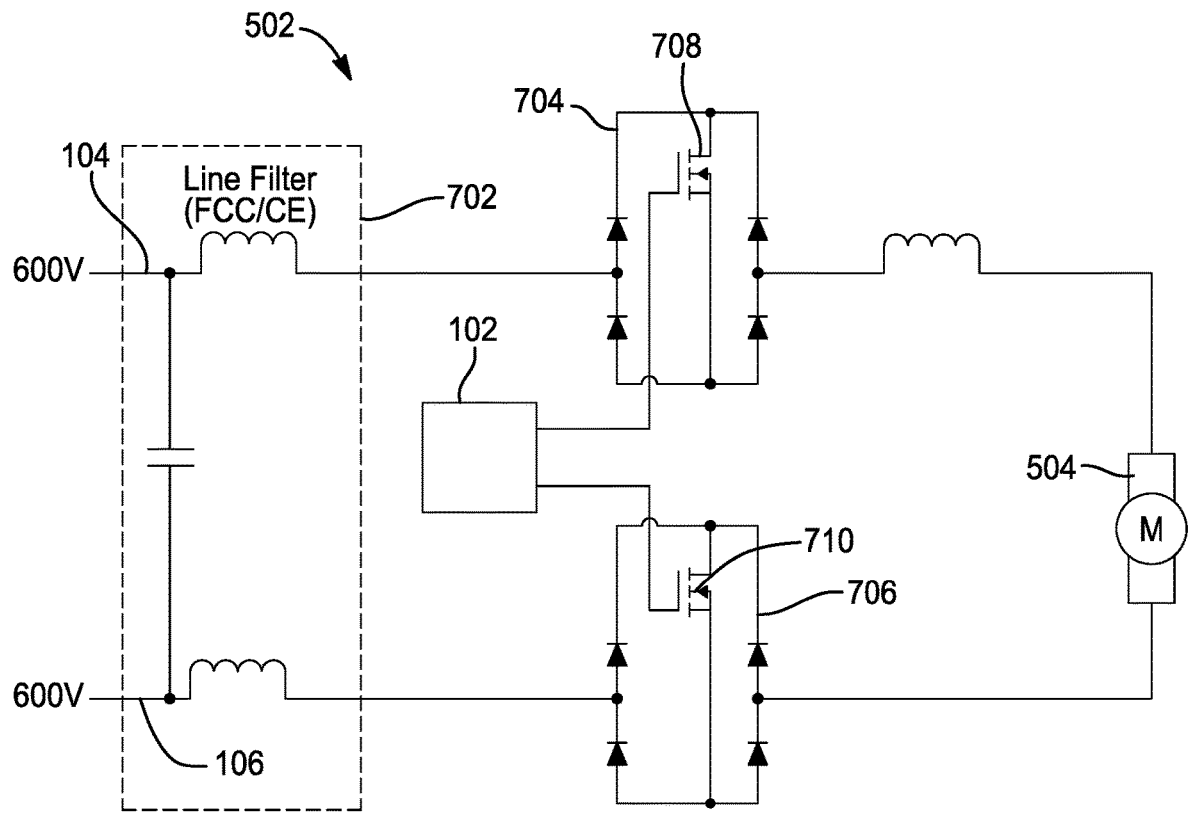
FIG. 7 is a circuit diagram illustrating the pump driving device that pulse-width modulates an AC signal in accordance with an example implementation of the present disclosure.

FIG. 7 illustrates an example circuit diagram of a pump driving device 502 that pulse-width modulates an AC signal provided to the pump 504. As shown, the pump driving device 502 includes line filter 702 to attenuate switching noise signals output via terminals 104, 106. The pump driving device 502 also includes diode bridges 704, 706 and switches 708, 710 that are connected to the diode bridges 704, 706, respectively. In an example implementation, the switches 708, 710 comprise transistors. The controller 102 controls the operational state of the switches 708, 710. For example, the controller 102 can be connected to the gates of the transistors to control the operational states of the transistors. The pump driving device 502 also includes an inductor 712 that drops the voltage within the pump driving device 502.

The controller 102 controls the duty cycle of the switches 708, 710 to control the voltage reduction ratio based upon the input voltage requirement. Referring to FIG. 7, the controller 102 controls the switches 708, 710 based upon the timing signal to pulse-width modulate the AC voltage to the desired AC voltage for the pump 504.

Figure 8:
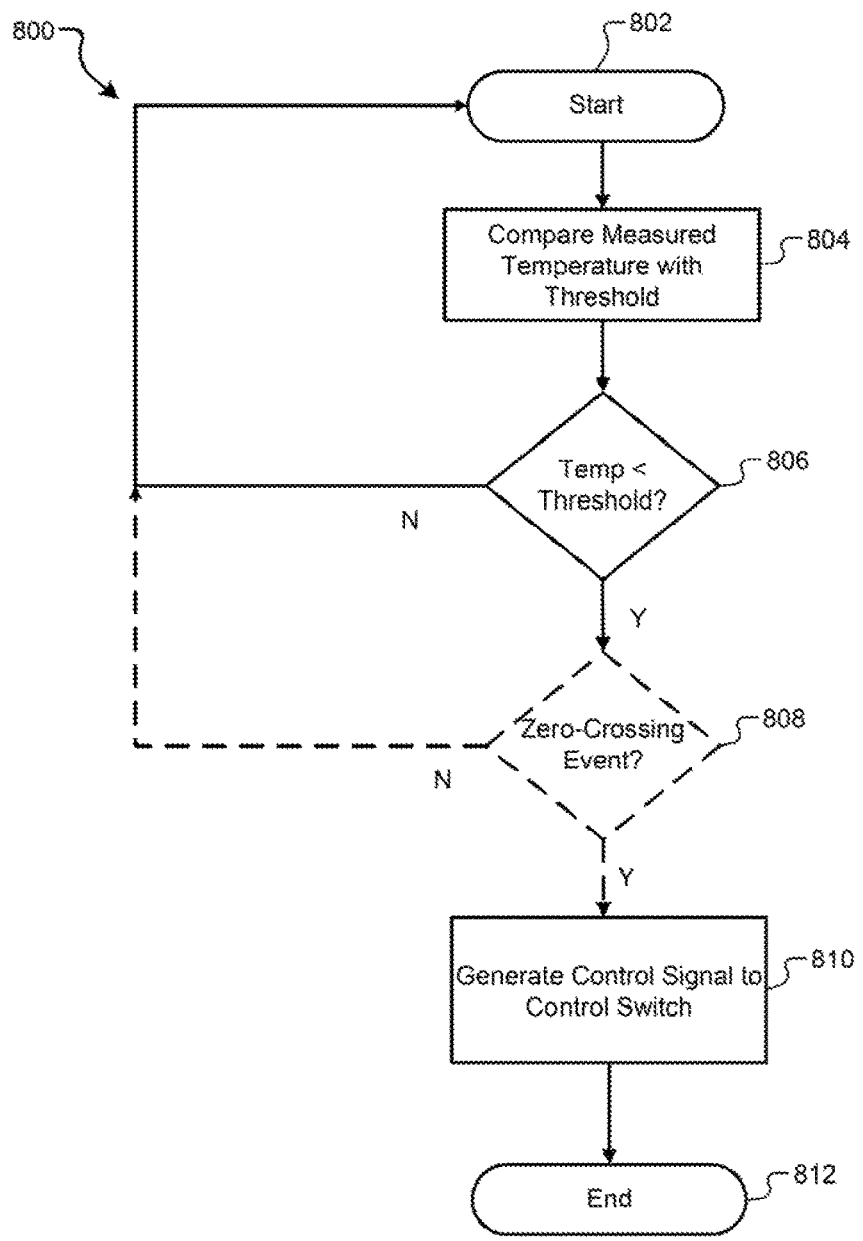
FIG. 8 illustrates an example method for controlling the heater control system in accordance with an example implementation of the present disclosure In the drawings, reference numbers may be reused to identify similar and/or identical elements.

In FIG. 8, an example operation 800 for controlling a fluid heater 110 is described. The method begins at 802. At 804, the temperature determination module 402 compares the measured temperature with a predetermined threshold. At 806, the temperature determination module 402 determines whether the measured temperature is below a predetermined temperature threshold. If the temperature is below the predetermined temperature threshold, the heater regulator module 406 determines whether a zero-crossing event signal is being received at 808. If the temperature is below the predetermined temperature threshold and a zero-crossing event signal is being received, the heater regulator module 406 generates one or more control signals to control one or more switches 114, 116 at 810. For example, the heater regulator module 406 directly controls the switch 114, 116 by providing a signal to the switch 114, 116. In another example, the heater regulator module 406 causes the electromagnetic radiation sources 115 to emit electromagnetic radiation to cause the switch 114, 116 to transition to an operational state. The method 800 ends at 812.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The interface circuits may also communicate via one or more suitable communication protocols including, but not limited to, Bluetooth, near-field communication, and the like. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A heater control system, comprising:
a fluid heater including at least one heating element that is operatively controlled by a switch and that heats a fluid of a vehicle when current flows through the at least one heating element;
a controller that is connected to the switch, wherein the controller is configured to:
determine whether the temperature of the fluid is below a first predetermined temperature threshold;
determine whether the ambient temperature is below a second predetermined temperature threshold;
determine whether a zero-crossing event is occurring;
cause the switch to transition to an operational state when the temperature of the fluid is below the first predetermined temperature threshold, the ambient temperature is below the second predetermined temperature threshold, a present time is a period before a departure time of the vehicle, and a zero-crossing event is occurring, allowing current to flow through the at least one heating element of the fluid heater; and
set the first predetermined temperature threshold based on a function of the ambient temperature; and
a pulse-width modulation device that is configured to generate a pulse-width modulated signal based upon a difference between the temperature of the fluid and the first predetermined temperature threshold, a duration of the pulse-width modulated signal being set by the pulse-width modulation device using a lookup table based on the temperature of the fluid and the first predetermined temperature threshold, and control the switch using the pulse-width modulated signal.

2. The heater control system of claim 1, further comprising a pump driving circuit that is configured to at least one of pulse-width modulate and phase modulate an alternating current (AC) signal, wherein the modulated AC signal is provided to a pump that is configured to regulate a flow rate of fluid within the fluid heater.

3. The heater control system of claim 1, further comprising an electromagnetic radiation source, wherein the controller is configured to cause the electromagnetic radiation source to emit electromagnetic radiation to cause the switch to transition to the operational state.

4. The heater control system of claim 3, wherein the switch comprises an optical bidirectional triode thyristor that is configured to transition to the operational state when the optical bidirectional triode thyristor detects the electromagnetic radiation.

5. The heater control system of claim 1, wherein the fluid heater comprises at least one of a single phase resistive fluid heater, a two phase resistive fluid heater, and a three phase resistive fluid heater.

6. The heater control system of claim 1, further comprising a plurality of switches and the fluid heater including a phase characteristic, wherein the number of switches corresponds to the phase characteristic.

7. The heater control system of claim 1 wherein the period is 3 hours.

8. A heater control system, comprising:
a controller that is connected to a switch that is connected to a fluid heater, the fluid heater including at least one heating element that heats a fluid of a vehicle when current flows through the at least one heating element, wherein the controller is configured to:
   determine whether the temperature of the fluid is below a first predetermined temperature threshold;
   determine whether the ambient temperature is below a second predetermined temperature threshold;
   determine whether a zero-crossing event is occurring;
   cause the switch to transition to an operational state when the temperature of the fluid is below the first predetermined temperature threshold, the ambient temperature is below the second predetermined temperature threshold, a present time is a period before a departure time of the vehicle, and a zero-crossing event is occurring, allowing current to flow through the at least one heating element of the fluid heater;
   set the first predetermined temperature threshold based on a function of the ambient temperature;
   diagnose a fault when a change in a temperature of a zone of the fluid heater over a predetermined time period is greater than an expected change in the temperature; and
   adjust heating of the fluid heater when the fault is diagnosed; and
a pulse-width modulation device that is configured to generate a pulse-width modulated signal based upon a difference between the temperature of the fluid and the first predetermined temperature threshold, a duration of the pulse-width modulated signal being set by the pulse-width modulation device using a lookup table based on the temperature of the fluid and the first predetermined temperature threshold, and control the switch using the pulse-width modulated signal.

9. The heater control of claim 8, further comprising a pump driving circuit that is configured to at least one of pulse-width modulate and phase-modulate an alternating current (AC) signal, wherein the modulated AC signal is provided to a pump that is configured to regulate a flow rate of fluid within the fluid heater.

10. The heater control of claim 8, further comprising an electromagnetic radiation source, wherein the controller is configured to cause the electromagnetic radiation source to emit electromagnetic radiation to cause the switch to transition to the operational state.

11. The heater control of claim 10, wherein the switch comprises an optical bidirectional triode thyristor that is configured to transition to the operational state when the optical bidirectional triode thyristor detects the electromagnetic radiation.

12. The heater control of claim 10, wherein the electromagnetic radiation source comprises a light-emitting diode.

13. The heater control of claim 8, wherein the fluid heater comprises at least one of a single phase resistive fluid heater, a two phase resistive fluid heater, and a three phase resistive fluid heater.

14. The heater control of claim 8, further comprising a plurality of switches and the fluid heater including a phase characteristic, wherein the number of the plurality of switches corresponds to the phase characteristic.

15. A heater control system, comprising:
a fluid heater including at least one heating element that is operatively controlled by a switch and heats a fluid of a vehicle when current flows through the at least one heating element;
a pulse-width modulation device; and
a controller that is connected to the switch, wherein the controller is configured to:
   determine whether the temperature of the fluid is below a first predetermined temperature threshold;
   determine whether the ambient temperature is below a second predetermined temperature threshold;
   determine whether a zero-crossing event is occurring;
   cause the pulse-width modulation device to generate a pulse-width modulated signal and operate the switch when the temperature of the fluid is below the first predetermined temperature threshold, the ambient temperature is below the second predetermined temperature threshold, a present time is a period before a departure time of the vehicle, and the zero-crossing event is occurring, allowing current to flow through the at least one heating element; and
   set the first predetermined temperature threshold based on a function of the ambient temperature;
wherein the pulse-width modulation device is configured to generate the pulse-width modulated signal based upon a difference between the temperature of the fluid and the first predetermined temperature threshold, a duration of the pulse-width modulated signal being set by the pulse-width modulation device using a lookup table based on the temperature of the fluid and the first predetermined temperature threshold, and control the switch using the pulse-width modulated signal.

16. The heater control system of claim 15, further comprising a pump driving circuit that is configured to at least one of pulse-width modulate and phase modulate an alternating current (AC) signal, wherein the modulated AC signal is provided to a pump that is configured to regulate a flow rate of fluid within the fluid heater.

17. The heater control system of claim 15, wherein the switch comprises an optical bidirectional triode thyristor that is configured to transition to an operational state when the optical bidirectional triode thyristor detects electromagnetic radiation generated by an electromagnetic radiation source controlled by the controller.

18. The heater control system of claim 15, wherein the fluid heater comprises at least one of a single phase resistive fluid heater, a two phase resistive fluid heater, and a three phase resistive fluid heater.

19. The heater control system of claim 15, further comprising a plurality of switches and the fluid heater including a phase characteristic, wherein the number of the plurality of switches corresponds to the phase characteristic.

* * * * *